United States Patent [19]

Hub et al.

[11] Patent Number: 4,880,876

[45] Date of Patent: Nov. 14, 1989

[54] THERMOPLASTIC POLYESTER MOLDING MATERIALS HAVING LOW-TEMPERATURE IMPACT STRENGTH

[75] Inventors: Hans-Henning Hub, Worms; Georg N. Simon, Limburgerhof; Gerhard Heinz, Weisenheim; Walter Ziegler, Edingen-Neckarhausen; Juergen Sadlowski, Muenster-Hiltrup, all of Fed. Rep. of Germany

[73] Assignee: BASF Aktiengesellschaft, Ludwigshafen, Fed. Rep. of Germany

[21] Appl. No.: 188,763

[22] Filed: May 2, 1988

Related U.S. Application Data

[63] Continuation of Ser. No. 94,023, Sep. 3, 1987, abandoned, which is a continuation of Ser. No. 875,573, Jun. 18, 1986, abandoned.

[30] Foreign Application Priority Data

Jun. 20, 1985 [DE] Fed. Rep. of Germany ....... 3521957

[51] Int. Cl.$^4$ .............................................. C08L 69/00
[52] U.S. Cl. ......................................... 525/67; 525/69
[58] Field of Search ................... 525/67, 69, 146, 148, 525/468, 902

[56] References Cited

U.S. PATENT DOCUMENTS

| | | | |
|---|---|---|---|
| 3,864,428 | 2/1975 | Nakamura et al. | 523/310 X |
| 4,172,859 | 10/1979 | Epstein | 428/402 |
| 4,220,735 | 9/1980 | Dieck et al. | 525/90 |
| 4,257,937 | 3/1981 | Cohen et al. | 525/67 X |
| 4,481,330 | 11/1984 | Ohara et al. | 525/67 |
| 4,482,672 | 11/1984 | Neuray et al. | 525/67 |
| 4,520,164 | 5/1985 | Liu | 525/67 |
| 4,535,124 | 8/1985 | Binsack et al. | 525/67 |

FOREIGN PATENT DOCUMENTS 0106027 12/1983 European Pat. Off. .

Primary Examiner—Theodore E. Pertilla
Attorney, Agent, or Firm—Keil & Weinkauf

[57] ABSTRACT

Thermoplastic polyester molding materials having low-temperature impact strength essentially consist of
(A) from 20 to 79 parts by weight of one or more aliphatic polyesters of an aromatic dicarboxylic acid having a relative viscosity of from 1.2 to 1.8,
(B) from 20 to 79 parts by weight of one or more aromatic polycarbonates having a relative viscosity of from 1.2 to 1.5,
(C) from 1 to 40 parts by weight of an elastomer blend consisting of
   1. from 5 to 95% by weight of an ethylene copolymer composed of
      (a) from 40 to 99% by weight of ethylene and
      (b) from 1 to 60% by weight of one or more comonomers containing carboxyl groups and/or derivatives of carboxyl groups, and
   2. from 5 to 95% by weight of an elastomeric graft polymer which is prepared by emulsion polymerization and composed of
      (a) from 70 to 95% by weight of a substantially crosslinked grafting base having a glass transition temperature $T_g$ below $-20°$ C. and
      (b) from 5 to 30% by weight of a graft shell consisting of one or more polymers having a glass transition temperature $T_g$ higher than 20° C., the amounts of components (A) to (C) summing to 100 parts by weight, and the amounts of components (1a) and (1b) and (2a) and (b) each summing to 100% by weight, and
(D) if required, conventional additives in effective amounts.

7 Claims, No Drawings

THERMOPLASTIC POLYESTER MOLDING MATERIALS HAVING LOW-TEMPERATURE IMPACT STRENGTH

This application is a continuation of application Ser. No. 07/094,023, filed on Sept. 3, 1987; which is a continuation of Ser. No. 06/875,573, filed on June 18, 1986 now both abandoned.

The present invention relates to thermoplastic molding materials which have not only good low-temperature impact strength but also very good hole-notch impact strength at low temperatures and are distinguished by high heat distortion resistance.

Polymer blends consisting of thermoplastic polyesters and polycarbonates are disclosed in DE-A-24 17 002. Compared with the pure polyesters, they have better mechanical properties. Attempts have already been made to improve the impact strength of polyester/polycarbonate blends by adding elastomers. According to German Patent No. 2,343,609, suitable modifiers are graft copolymers based on polybutadiene. EP-A 20 605 recommends polyacrylate graft rubbers for this purpose. EP-A 20 737 describes mixtures in which polyester/polycarbonate blends are modified with styrene/diene block copolymers. German Laid-Open Application No. DOS 2,622,876 discloses blends which consist of a polycarbonate and an ethylene copolymer or of a polyester and an ethylene copolymer. The copolymer is added to improve the impact strength. According to German Laid-Open Application No. DOS 3,234,174, ethylene copolymers containing carboxyl groups have been added to blends of polycarbonates and polyesters.

However, all known blends exhibit unsatisfactory notched impact strengths at low temperatures; in particular, the combination of good impact strength at low temperatures and high heat distortion resistance was not achieved.

It is an object of the present invention to provide impact-resistant thermoplastic polyester molding materials which are distinguished by good mechanical properties and have good notched impact strength at low temperatures coupled with good hole-notch impact strength and heat distortion resistance.

We have found that this object is achieved by thermoplastic polyester molding materials which have low-temperature impact strength and essentially contain (A) from 20 to 79 parts by weight of one or more aliphatic polyesters of an aromatic dicarboxylic acid having a relative viscosity of from 1.2 to 1.8, (B) from 20 to 79 parts by weight of one or more aromatic
polycarbonates having a relative viscosity of from 1.2 1.5, (C) from 1 to 40 parts by weight of an elastomeric blend consisting of 1. from 5 to 95% by weight of an ethylene copolymer composed of
  (a) from 40 to 99% by weight of ethylene and
  (b) from 1 to 60% by weight of one or more comonomers containing carboxyl groups and/or derivatives of carboxyl groups, and 2. from 95 to 5% by weight of an elastomeric graft polymer prepared by emulsion polymerization and composed of (a) from 70 to 95% by weight of a substantially cross linked grafting base having a glass transition temperature $T_g$ below $-20°$ C. and
  (b) from 5 to 30% by weight of a grafted shell consisting of one or more polymers having a glass transition temperature $T_g$ higher than 20° C., the sum of components (A) to (C) and 1. (a) and (b) and
  (a) and (b) being 100 parts by weight or 100% by weight, respectively, and (D) if required, conventional additives in effective amounts.

The novel impact-resistant thermoplastic polyester molding materials are distinguished by good mechanical properties as well as good notched impact strengths at low temperatures and good hole-notch impact strengths in combination with high heat distortion resistance.

The polyesters used according to the invention (component A) are known per se. They possess chain units which contain an unsubstituted or substituted aromatic ring in the polymer chain. Examples of such substituents of the aromatic ring are halogen, such as chlorine or bromine, and $C_1$–$C_4$-alkyl, such as methyl, ethyl, propyl or butyl. Suitable polyesters are prepared, for example, by reacting the appropriate aromatic dicarboxylic acids, their esters or other ester-forming derivatives with dihydroxy compounds in a conventional manner. Examples of suitable dihydroxy compounds are glycols of 2 to 6 carbon atoms, in particular ethylene glycol, butane-1,4-diol, butene-1,4-diol or hexane-1,6-diol, as well as hexane-1,4-diol, cyclohexane-1,4-diol, 1,4-bis-(hydroxymethyl)-cyclohexane, bisphenol A, neopentyl glycol and mixtures of these.

Examples of suitable aromatic dicarboxylic acids are naphthalenedicarboxylic acid, terephthalic acid, isophthalic acid, their ester-forming derivatives and mixtures of these.

In the polyesters, some of the aromatic dicarboxylic acids, e.g. up to 10 mol %, may be replaced with other dicarboxylic acids. Suitable modifiers are aliphatic o cycloaliphatic dicarboxylic acids, such as adipic acid, azelaic acid, sebacic acid, dodecanedioic acid or cyclohexanedicarboxylic acid.

Preferred polyesters are polyalkylene terephthalates which are derived from alkanediols of 2 to 6 carbon atoms. Polyethylene terephthalate and especially polybutylene terephthalate are particularly preferred. The polyesters (component A) possess a relative viscosity of from 1.2 to 1.8, measured in a 0.5% strength by weight solution in a mixture of phenol and o-dichlorobenzene in a weight ratio of 3:2, at 25° C.

The aromatic polycarbonates used according to the invention (component B) are known per se. They are obtainable, for example, by boundary polycondensation by the process described in German Patent 1,300,266, or by transesterification of diphenyl carbonate with bisphenol A by the process described in German Laid-Open Application DOS 1,495,730. Instead of bisphenol A, it is possible to use, for example, up to 30 mol % of other aromatic bishydroxy compounds, in particular 2,2-bis-(4-hydroxyphenyl)-pentane, 2,6-dihydroxynaphthalene, bis-(4-hydroxyphenyl) sulfone, bis-(4-hydroxyphenyl) ether, bis-(4-hydroxyphenyl) sulfide, bis-(4-hydroxyphenyl)-methane, 1,1-bis-(4-hydroxyphenyl)ethane or 4,4-dihydroxydiphenyl.

Polycarbonates which are suitable for the purpose according to the invention have a relative viscosity of from 1.2 to 1.5, preferably from 1.28 to 1.40, measured at 25° C. in a 0.5% strength by weight methylene chloride solution.

The novel molding materials contain, as component C, from 1 to 40, in particular from 5 to 30, parts by weight, of a blend of 2 elastomers. The elastomer blend consists of 1. from 5 to 95, in particular from 20 to 80, % by weight of an ethylene copolymer composed of
   (a) from 40 to 99, preferably from 60 to 95, % by weight of ethylene and
   (b) from 1 to 60, preferably from 5 to 40, % by weight of one or more comonomers containing carboxyl groups and/or derivatives of carboxyl groups.

Examples of suitable comonomers 1b are acrylic acid, methacrylic acid, fumaric acid, maleic acid, maleic anhydride and derivatives of these acids, their $C_1$-$C_8$-alkyl esters, their amides, where the nitrogen atom of the amide group may be substituted by $C_1$-$C_8$-alkyl, salts of these acids, in particular alkali metal salts, and acrylonitrile.

Preferred ethylene copolymers have a glass transition temperature below 0° C., in particular below −20° C. They generally have a high molecular weight and a melt flow index MFI 190/2.16 (DIN 53,735) of from 1 to 80. . The ethylene copolymers are prepared in a conventional manner by polymerization of the components at elevated temperatures under a high ethylene pressure. The elastomer blend (component C) additionally consists of 2. from 5 to 95%, in particular from 20 to 80, % by weight of an elastomeric graft polymer prepared by emulsion polymerization and composed of
   (a) from 70 to 95% by weight of a substantially crosslinked grafting base having a glass transition temperature $T_g$ below −20° C. and
   (b) from 5 to 30% by weight of a grafted shell consisting of one or more polymers having a glass transition temperature $T_g$ higher than 20° C.

For the purposes of the present invention, in principle all graft polymers are suitable provided that they possess elastomeric properties and have a glass transition temperature $T_g$ below −20° C., in particular from −150° to −20° C.

Examples of such graft polymers are systems based on polybutadiene, as described in, for example, German Patent No. 1,252,902, or systems based on acrylates, as described in German Patent 2,444,584. Graft copolymers which have a core based on polybutadiene are particularly suitable.

The graft polymers are prepared by known methods, for example as described in Houben-Weyl, Methoden der Org. Chemie, Volume XIV/1, 1961, pages 396 to 399, in particular 397.

A polybutadiene latex which constitutes the soft core of the graft rubber is first prepared. This soft core essentially consists of crosslinked polybutadiene. The gel content of the core is advantageously greater than 80% by weight. In addition to butadiene, up to 20% by weight of other monomers and the grafting base may be incorporated. Examples of these are styrene, acrylonitrile, esters of acrylic or methacrylic acid with $C_1$-$C_8$-alkanols, as well as dienes, such as isoprene, chloroprene or other vinyl compounds which can be copolymerized with butadiene. The grafting base therefore advantageously contains not less than 80% by weight of polybutadiene units.

A hard graft shell consisting of one or more polymers having a glass transition temperature greater than 20° C. is grafted on to this grafting base. If necessary, a plurality of graft shells may be grafted on. Preferred monomers for producing the graft shell are mixtures of styrene/acrylonitrile in a weight ratio of from 3.5:0.5 to 2.5:1.5, as well as methyl acrylate or methyl methacrylate and mixtures of these. Small amounts, e.g. up to 10% by weight, based on the sum of the graft monomers, or other monomers may also be incorporated into the graft shell, e.g. acrylates of $C_1$-$C_{10}$-alkanols, methacrylates of $C_2$-$C_{10}$-alkanols, and vinyl derivatives containing reactive groups, such as allyl (meth)acrylate, maleic anhydride or itaconic acid.

The particles of the graft polymer advantageously have a diameter of from 0.05 to 0.6 $\mu$m, and preferably not less than 80% of the particles have a diameter of from 0.05 to 0.2 $\mu$m.

The molding materials according to the invention may additionally contain additives in effective amounts. Examples of conventional additives are stabilizers and antioxidants, heat stabilizers and UV stabilizer,, lubricants and mold release agents, colorants, such as dyes and pigments, fibrous and pulverulent fillers and reinforcing agents, nucleating agents and plasticizers. Such additives are used in the conventional effective amounts.

The stabilizers may be added to the thermoplastic materials at any stage during their preparation, but are preferably introduced at an early stage in order to prevent decomposition from beginning before the material can be protected. Such stabilizers must be compatible with the material.

The antioxidants and heat stabilizers which can be added to the thermoplastic materials according to the invention include those which are generally added to polymers, such as halides of metals of group I of the periodic table, e.g. sodium halides, potassium halides and lithium halides, in conjunction with copper(I) halides, e.g. the chloride, bromide or iodide. Other suitable stabilizers are sterically hindered phenols, hydroquinones, variously substituted members of this group and combinations of these, in concentrations of up to 1% by weight, based on the weight of the mixture.

Suitable UV stabilizers are likewise those which are generally added to polymers, these stabilizers being employed in amounts of up to 2% by weight, base on the mixture. Examples of UV stabilizers are variously substituted resorcinols, salicylates, benzotriazoles, benzophenones, etc.

Suitable lubricants and mold release agents, which may be added, for example, in amounts of up to 1% by weight, based on thermoplastic material, are stearic acids, stearyl alcohol, stearates and stearamides. Organic dyes, such as nigrosine, and pigments, e.g. titanium dioxide, cadmium sulfide, cadmium sulfide selenide, phthalocyanines, ultramarine blue or carbon black, may also be added. Moreover, the novel molding materials may contain fibrous and pulverulent fillers and reinforcing agents, such as carbon fibers, glass fibers, amorphous silica, asbestos, calcium silicate, calcium metasilicate, aluminum silicate, magnesium carbonate, kaolin, chalk, quartz powder, mica or feldspar, in amounts of up to 50% by weight, based on the molding material. Nucleating agents, such as talc, calcium fluoride, sodium phenylphosphinate, alumina or finely divided polytetrafluoroethylene, may also be used, in amounts of, for example, up to 5% by weight, based on material. Plasticizers, such as dioctyl phthalate, dibenzyl phthalate, butylbenzyl phthalate, hydrocarbon oils, N-n-butylbenzenesulfonamide and o- and p-tolueneethylsulfonamide are advantageously added in amounts of up to about 20% by weight, based on the molding material. Colorants, such as dyes and pigments, can be added in amounts of up to about 5% by weight, based on the molding material.

The molding materials according to the invention are prepared, for example, by mixing a polyester, a polycarbonate, an ethylene copolymer and a precipitated graft rubber, and mixing the elastomers into the molten mixture of the polyester and the polycarbonate in a conventional mixing apparatus, such as a screw extruder, a Brabender mill or a Banbury mill. In a preferred procedure, the polyester, the polycarbonate and the ethylene copolymer are mixed in the molten state in an extruder, the graft rubber dispersion is then added through feed orifices 10 arranged along the extruder and is mixed thoroughly with the polymer melt, and water and volatile constituents are removed via a devolatilization vent. The material is then extruded, and the extrudates are cooled and comminuted. The mixing temperatures are as a rule from 240° to 270° C. In a particularly preferred procedure, a concentrate of the polyester and/or polycarbonate, which contains from 20 to 70% by weight of graft rubber, is first prepared. The graft rubber is then introduced into the polyester and/or polycarbonate melt as described above, advantageously as a dispersion. The material is then solidified to a master batch, which is comminuted. Thereafter, the polyester, the polycarbonate and the ethylene copolymer are mixed thoroughly with the master batch in the molten state in an extruder, the mixture is extruded, and the extrudates are cooled and comminuted.

The novel molding materials are useful for producing, by injection molding or extrusion, thermally stable impact-resistant moldings which can be subjected to high loads and are suitable for all kinds of technical purposes.

The Examples which follow illustrate the invention.

EXAMPLES 1 to 4

Polybutylene terephthalate (PBT) was mixed thoroughly with a polycarbonate (PC) and the impact modifiers, and the mixture was melted at 250° C., homogenized and extruded into a water bath, these steps being carried out in a type ZSK 30 twin-screw extruder from Werner and Pfleiderer. After granulation and drying, the blends were molded to test specimens on an injection molding machine, and these specimens were tested without further after-treatment.

The polybutylene terephthalate used had a relative viscosity of 1.60, measured in a 0.5% strength solution in 1:1 phenol/o-dichlorobenzene at 25° C.

The bisphenol A-based polycarbonate used had a relative viscosity of 1.36, measured in a 0.5% strength solution in methylene chloride at 25° C.

In Comparative Examples 1 and 3, an acrylate graft rubber according to German Patent No. 2,444,584 (type A) was used. In Comparative Example 2, a polybutadiene rubber described in German Patent No. 2,343,609 was employed.

The copolymers used in the novel Examples possess the following melt flow indices, measured at 190° C. and under a load of 2.16 kg:

TABLE 1

| Example No. | Copolymer composition | MFI 190°/2.16 (G/10 min) |
|---|---|---|
| 3, 5, 7 | E-nBA-AA (64-31-5) | 17 |
| 6, 9, 10, 12 | E-nBA-AA (66-30-4) | 15 |
| 11 | E-AA (92-8) | 7 |
| 8 | E-nBA-MAA (62-35-3) (acid number 50) | 35 | ethylene
nBA = n-butyl acrylate
MAA = maleic anhydride
AA = acrylic acid

The compositions of the novel copolymers are shown in Table 1, as percentages by weight of the corresponding monomers. The content of maleic anhydride in the copolymers of Example 8 is additionally characterized by the acid number, stated in mg of KOH required to neutralize 1 g of copolymer.

Table 2 shows that a certain low-temperature impact strength can be achieved with acrylate rubber (comparative experiment 1). The impact strength is only slightly improved by the combination of acrylates and ethylene copolymers (comparative experiment 3). Polybutadiene rubbers increase the notched impact strength without improving the hole-notch impact strength (comparative experiments 2 and 4). The copolymers alone also give unsatisfactory values (comparative experiment 5).

Examples 6 to 12 according to the invention demonstrate that, by adding the butadiene rubbers and the ethylene copolymers according to the invention, it is possible to achieve high heat distortion resistance and good notched impact strength at low temperatures, with very good hole-notch impact strength at low temperatures.

TABLE 2

| | Composition | | | | Notched impact strength $a_k$ [kJ/m²] | | Hole-notch impact strength $a_{LK}$ [kJ/m²] | | Vicat number |
|---|---|---|---|---|---|---|---|---|---|
| Example No. | PBT % | PC % | Modifier % | Type | −20° C. | −40° C. | −20° C. | −40° C. | °C. |
| 1 (Comparison) | 40 | 50 | 10 | acrylate | 6.4 | 4.2 | 96 | 79 | 80 |
| 2 " | 40 | 50 | 10 | polybutadiene I | 30 | 10 | 69 | 64 | 123 |
| 3 " | 40 | 50 | 5 / 5 | acrylate / E-BA-AA | 10 | 5 | 89 | 64 | 120 |
| 4 " | 40 | 50 | 10 | polybutadiene II | 6.4 | 5.8 | 77 | 52 | 75 |
| 5 " | 40 | 50 | 10 | E-nBA-AA | 6.0 | 6.0 | 83 | 52 | 122 |
| 6 according to the invention | 40 | 50 | 5 / 5 | polybutadiene I / E-nBA-AA | 15.8 | 8.8 | 82 | 78 | 118 |
| 7 | 40 | 50 | 5 / 5 | polybutadiene II / E-nBA-AA | 14.1 | 7.4 | 112 | 110 | 118 |
| 8 | 50 | 40 | 5 / 5 | polybutadiene II / E-nBA-AA | 6.7 | 4.6 | 108 | 65 | 128 |
| 9 | 45 | 45 | 5 / 5 | polybutadiene II / E-nBA-AA | 11 | 6.4 | 103 | 93 | 121 |

TABLE 2-continued

| Example No. | Composition | | | | Notched impact strength $a_k$ [kJ/m²] | | Hole-notch impact strength $a_{LK}$ [kJ/m²] | | Vicat number °C. |
| | PBT % | PC % | Modifier % | Type | −20° C. | −40° C. | −20° C. | −40° C. | |
|---|---|---|---|---|---|---|---|---|---|
| 10 | 40 | 45 | 10 | polybutadiene II | | | | | |
| | | | 5 | E-nBA-AA | 39.2 | 10.7 | 93 | 86 | 118 |
| 11 | 40 | 48 | 10 | polybutadiene II | | | | | |
| | | | 2 | E-AA | 14.3 | 6.8 | 99 | 79 | 121 |
| 12 | 40 | 50 | 5 | polybutadiene II | | | | | |
| | | | 5 | E-nBA-AA | 12 | 7 | 83 | 76 | 122 |

Remarks on Table 2:
Notched impact strength determined according to DIN 53,45 Hole-notch impact strength determined according to DIN 53,753

Polybutadiene I

Graft polymer based on polybutadiene and having a grafted shell consisting of 10% of styrene and 20% of methyl methacrylate (Paraloid KM653 from Rohm & Haas). Spray-dried rubber is mixed into the melt.

Polybutadiene II

Graft polymer based on polybutadiene and possessing 20% of a grafted shell of a 3:1 styrene/acrylonitrile mixture
Gel content: 80%
Particle size: 0.1–0.3 μm
Mixing: The aqueous rubber dispersion, which had a solids content of about 50%, was incorporated into the PBT melt. The resulting blend (50% rubber content), in the form of granules, was mixed with the PC, the PBT granules and the ethylene copolymer granules, and the mixture was extruded.

We claim:
1. A thermoplastic polyester molding material which has low-temperature impact strength and essentially contains:
   (A) from 20 to 79 parts by weight of one or more aliphatic polyesters of an aromatic dicarboxylic acid having a relative viscosity of from 1.2 to 1.8,
   (B) from 20 to 79 parts by weight of one or more aromatic polycarbonates having a relative viscosity of from 1.2 to 1.5,
   (C) from 1 to 40 parts by weight of an elastomer blend consisting of I4
   1. from 5 to 95% by weight of an ethylene copolymer composed of
      (a) from 40 to 99% by weight of ethylene and
      (b) from 1 to 60% by weight of one or more comonomers having a radical selected from the group consisting of carboxyl groups and derivatives of carboxyl groups and mixtures thereof, and
   2. from 5 to 95% by weight of an elastomeric graft polymer which is prepared by emulsion polymerization and composed of
      (a) from 70 to 95% by weight of a substantially crosslinked grafting base not less than 80% by weight of which consists of butadiene having a glass transition temperature $T_g$ below −20° C. and
      (b) from 5 to 30% by weight of a graft shell consisting of one or more polymers having a glass transition temperature $T_g$ higher than 20° C., the amounts of components (A) to (C) summing to 100 parts by weight, and the amounts of components (1a) and (1b) and (2a) and (b) each summing to 100% by weight, wherein, in the graft rubber, not less than 80% of the particles have a diameter of from 0.05 to 0.2 μm.

2. An impact-resistant thermoplastic molding material as claimed in claim 1 wherein the component (A) is a $C_2$–$C_4$-polyalkylene terephthalate.

3. An impact-resistant thermoplastic molding material as claimed in claim 1, wherein the component (B) is a polycarbonate based on bisphenol A.

4. An impact-resistant thermoplastic molding material as claimed in claim 1, wherein the component (C 1) has a melt flow index MFI #2.16 of from 1 to 80, measured according to DIN 55,735, and a glass transition temperature below 0° C.

5. An impact-resistant thermoplastic molding material as claimed in claim 1, in the comonomer (b) of component C1) is acrylic acid, methacrylic acid, fumaric acid, maleic acid, maleic anhydride, a $C_1$–$C_8$-alkyl ester, an amide or a $C_1$–$C_8$-alkyl- or dialkylamide or a salt of one of these acids, or acrylonitrile.

6. An impact-resistant thermoplastic molding material as claimed in claim 1, wherein a graft rubber (C2) is used which has a particle size of form 0.05 to 0.6 μm and is composed of
   (a) A grafting base which consists of not less than 80% by weight of butadiene and
   (b) a graft shell of a polymer of styrene and a member selected from the group consisting of acrylonitrile in a weight ratio of 2.5:1–3.5:0.5 and methyl methacrylate and mixtures thereof.

7. An impact-resistant thermoplastic molding material as claimed in claim 1 which is prepared by mixing a melt of the polyester (component A) and the polycarbonate (component B) and an ethylene copolymer (component C1) and an aqueous dispersion of the graft polymer (component C2) with simultaneous removal of the water which vaporizes.

* * * * *

UNITED STATES PATENT AND TRADEMARK OFFICE
CERTIFICATE OF CORRECTION

PATENT NO. :   4,880,876
DATED      :   Nov. 14, 1989
INVENTOR(S) :  Hub et al.

It is certified that error appears in the above-identified patent and that said Letters Patent is hereby corrected as shown below:

IN THE CLAIMS:

Col. 7, line 47   "I4" should be omitted

"  . 8,  "   34   "#" should be omitted; substitute -- 190/ --

"  ",   "    35   "55,735" should be omitted; substitute -- 53,735 --

"  ",   "    45   "form" should be -- from --

Signed and Sealed this

Sixth Day of November, 1990

Attest:

HARRY F. MANBECK, JR.

Attesting Officer    Commissioner of Patents and Trademarks